United States Patent
Miyano

[19]

[11] Patent Number: 5,842,396
[45] Date of Patent: Dec. 1, 1998

[54] STRUCTURAL FRAME FOR A MACHINE TOOL

[76] Inventor: Toshiharu Tom Miyano, c/o Miyano Machinery USA Inc., 940 N. Central Ave., Wood Dale, Ill. 60191

[21] Appl. No.: 908,454

[22] Filed: Aug. 7, 1997

[51] Int. Cl.$^6$ .................................................. B23B 17/00
[52] U.S. Cl. .............................. 82/149; 82/901; 408/234
[58] Field of Search ............................. 82/149, 117, 901; 408/234, 235, 236, 237; 409/236, 240, 241

[56] References Cited

U.S. PATENT DOCUMENTS

| 3,800,636 | 4/1974 | Zagar ................................... 408/234 X |
| 4,165,661 | 8/1979 | Wasco, Jr. et al. ....................... 82/117 |
| 4,981,056 | 1/1991 | Brown et al. .......................... 82/117 X |

FOREIGN PATENT DOCUMENTS

| 0093800 | 11/1983 | European Pat. Off. .................. 82/149 |
| 8100688 | 9/1982 | Netherlands .............................. 82/149 |

Primary Examiner—Andrea L. Pitts
Assistant Examiner—Henry W.H. Tsai
Attorney, Agent, or Firm—Wood, Phillips, VanSanten, Clark & Mortimer

[57] ABSTRACT

A structural frame is provided for a machine tool including a tool holder and a workpiece holder for holding the workpiece as the workpiece is machined by a cutting tool held in the tool holder. The frame includes a base, a bed for supporting a tool holder and a workpiece holder as the tool holder and the workpiece holder cooperate to machine a workpiece, and structure cooperating between the bed and the base for simultaneous movement of the bed, a tool holder supported by the bed and a workpiece holder supported by the bed relative to the base between (a) a first operative position where the tool holder and the workpiece holder are supported by the bed at a first angular orientation relative to the base as the tool holder and the workpiece holder cooperate to machine a workpiece, and (b) a second operative position where the tool holder and the workpiece holder are supported by the bed at a second angular orientation relative to the base as the tool holder and the workpiece holder cooperate to machine a workpiece.

9 Claims, 2 Drawing Sheets

STRUCTURAL FRAME FOR A MACHINE TOOL

FIELD OF THE INVENTION

This invention relates to structural frames for supporting machine tool components, and more particularly, to structural frames for slant-bed machine tools and a method for making the same.

BACKGROUND ART

Structural frames for slant-bed machine tools, in particular for slant-bed CNC lathes, are well known in the prior art. Such frames allow positioning of the machine tool operating components and the mount surfaces therefor at a slant angle that is neither fully vertical nor fully horizontal.

One advantage of the slant-bed configuration is the reduction in thermal distortion of the bed structure caused by machining debris accumulation on the bed structure. By utilizing gravitational forces, the slant angle of the slant-bed facilitates an increased rate of machining debris disposal from the slant-bed, thereby reducing the amount of heat which is transferred from the machine debris to the bed.

Accuracy and high production are two of the factors considered when selecting the slant angle for a slant-bed machine tool that is intended for a particular application. Obviously, steeper slant angles tend to increase the machining debris disposal rate and therefore are preferred for high production applications that generate machining debris at a relatively high rate. However, the accuracy of the machine tool may decrease as the slant angle is increased because the torque exerted on the structural frame by the cantilevered machine tool components increases.

Another factor that is considered when selecting a slant-bed machine tool is the compatibility of the slant-bed machine tool with existing production lines of the machine tool users, and in particular, with the material-handling systems of the existing production lines. The compatibility of the slant-bed machine tool is largely dependent upon the slant angle provided by the slant-bed machine tool.

Accordingly, when selecting the slant angle for a slant-bed structural frame intended for use in a particular application, there is usually a balancing between the considerations of accuracy, production and compatibility.

Typically, the structural frames for slant-bed machine tools incorporate a bed element having at least one machined surface for supporting the operating components of the machine tool. The bed element is normally produced from cast iron having a substantially trapezoidal cross section defined by two parallel surfaces and two nonparallel surfaces. One of the nonparallel surfaces defines the slant angle and one of the parallel sides defines either a base surface or a mating surface for attachment to a separate base element. Normally, the nonparallel surface defining the slant angle is machined on a gantry-type milling machine to produce the machined surface for supporting the operating components of the machine tool. During this machine operation, the bed element is supported in a custom jig which positions the bed element so that the nonparallel surface is parallel with the horizontal machining plane of the milling machine.

One disadvantage of this type of bed element is that a customized iron casting, with associated mold tooling, must be provided for each of the various slant angles that may be dictated by considerations of production, accuracy, and compatibility generated by various machining applications. A slant-bed machine tool manufacturer may be limited as to the number of slant angles that are offered because of the expense associated with producing, storing, and maintaining the different sets of mold tooling required for each of the different castings.

Another disadvantage of this type of structural frame is that a separate custom jig may have to be provided for each of the different castings so that the machined surface is positioned parallel to the horizontal machining plane of the gantry-type milling machine. Again, a slant-bed machine tool manufacturer may be limited as to the number of slant angles that are offered for the slant-bed machine tools because of the expense associated with producing, maintaining, and storing each of the different jigs.

A further disadvantage of this type of structural frame is that the use of the custom jig in the machining of the component mount surface may limit the size of the milling machines that are capable of accommodating both the bed element and the custom jig. Obviously, there is an increased cost associated with purchasing larger sizes of milling machines and providing the requisite floor space.

Another disadvantage associated with this type of structural frame is that the substantially trapezoidal cross section of the bed element may complicate the analysis of the thermal and stress-related distortions of the bed element. Further, because every slant angle requires a bed element having a different trapezoidal cross section, these complicated analyses must normally be completely repeated every time a slant-bed machine tool having a different slant angle is added to the product line offered by a slant-bed machine tool manufacturer.

Yet another disadvantage associate with this type of structural frame is that the assembly of the operating components onto the structural frame may be complicated by the semi-vertical orientation of the slant bed frame. Typically, special assembly tools must be made to support the weight of each of the machining components as it is being assembled onto the slant-bed frame. The special assembly tools represent additional expense.

SUMMARY OF THE INVENTION

In accordance with the present invention, a structural frame is provided for a machine tool including a tool holder and a workpiece holder for holding the workpiece as the workpiece is machined by a cutting tool held in the tool holder. The frame includes a base, a bed for supporting a tool holder and a workpiece holder as the tool holder and the workpiece holder cooperate to machine a workpiece, and structure cooperating between the bed and the base for simultaneous movement of the bed, a tool holder supported by the bed and a workpiece holder supported by the bed relative to the base between (a) a first operative position where the tool holder and the workpiece holder are supported by the bed at a first angular orientation relative to the base as the tool holder and the workpiece holder cooperate to machine a workpiece, and (b) a second operative position where the tool holder and the workpiece holder are supported by the bed at a second angular orientation relative to the base as the tool holder and the workpiece holder cooperate to machine a workpiece.

In one form, the cooperating structure includes a first fastener hole pattern on the base and a second fastener hole pattern on the bed. The first and second fastener hole patterns are aligned in both the first position and the second position.

In one form, the cooperating structure includes structure for mounting the bed on the base for pivotable movement between the first and second positions.

In one form of the invention, a structural frame is provided for a machine tool including a tool holder and a workpiece holder for holding the workpiece as the workpiece is machined by a cutting tool held in the tool holder. The frame includes a base and a bed for supporting a tool holder and a workpiece holder as the tool holder and the workpiece holder cooperate to machine a workpiece. The base includes a first fastener hole pattern and the bed includes a second fastener hole pattern that is alignable with the first fastener hole pattern to mount the bed on the base selectively in each of (a) a first operative position where a tool holder and a workpiece holder are supported by the bed at a first angular orientation relative to the base as the tool holder and the workpiece holder cooperate to machine a workpiece, and (b) a second operative position where a tool holder and a workpiece holder are supported by the bed at a second angular orientation relative to the base as the tool holder and the workpiece holder cooperate to machine a workpiece.

In one form, the base comprises a first stanchion spaced from a second stanchion, and the first fastener hole pattern is located on the first stanchion.

In one form, the frame further includes structure cooperating between the bed and the stanchions for simultaneous movement of the bed, a tool holder supported by the bed, and a workpiece holder supported by the bed between the first and second positions.

In one form of the invention, a structural frame is provided for a machine tool including a tool holder and a workpiece holder for holding the workpiece as the workpiece is machined by a cutting tool held in the tool holder. The frame includes a base, and a bed for supporting a tool holder and a workpiece holder. The bed is pivotable on the base about an axis and has a center of gravity located relative to the axis to counterbalance the moment about the axis created by a tool holder and a workpiece holder supported on the bed.

In one form, a process for manufacturing a structural frame for a machine tool is provided. The process includes the steps of forming a base having a first fastener hole pattern; forming a bed having structure for supporting a tool holder and a workpiece holder as the tool holder and the workpiece holder cooperate to machine a workpiece; forming a second fastener hole pattern on the bed that is alignable with the first fastener hole pattern selectively in each of (a) a first operative position where a tool holder and a workpiece holder are supported by the bed at a first angular orientation relative to the base as the tool holder and workpiece holder cooperate to machine a workpiece, and (b) a second operative position where a tool holder and a workpiece holder are supported by the bed at a second angular orientation relative to the base as the tool holder and the workpiece holder cooperate to machine a workpiece; aligning the first and second fastener hole patterns in one of the first and second positions; and fastening the bed to the base in one of the first and second positions using the fastener hole patterns.

DETAILED DESCRIPTION OF THE PREFERRED EMBODIMENT

Figure 1:
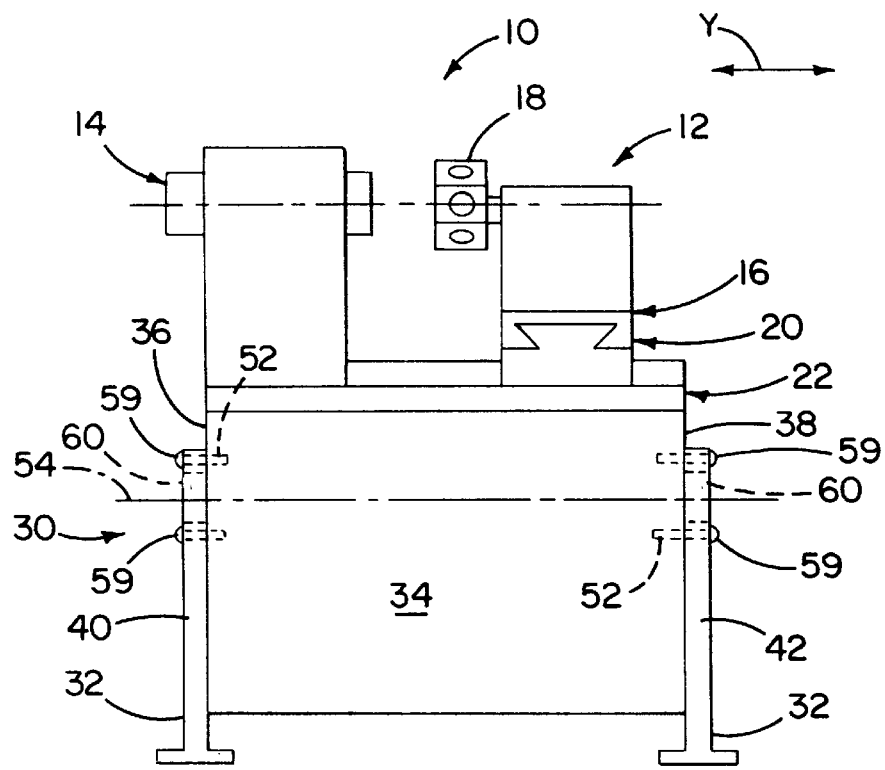
FIG. 1 is a front elevation view of a machine tool having a slant bed structural frame embodying the present invention.
Figure 2:
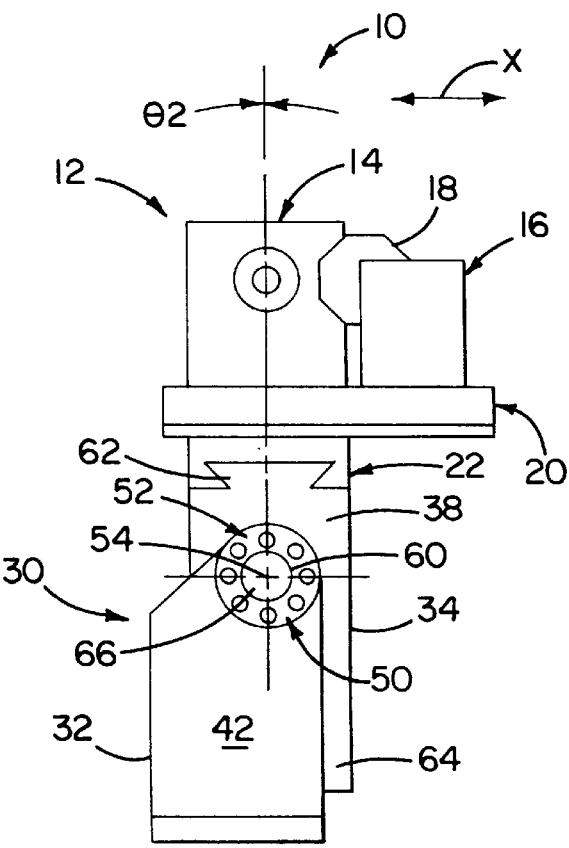
FIG. 2 is a right side elevation view of the machine tool shown in FIG. 1 with the structural frame in a first orientation, with a portion of the frame broken away to reveal hidden elements.

As shown in FIGS. 1 and 2, the invention is embodied in a machine tool 10 illustrated in the form of a CNC lathe. The lathe 10 includes conventional operating components 12 that are well known to those skilled in the art. The operating components 12 include a workpiece holder 14 in the form of a spindle assembly for rotating a workpiece (not shown), and a cutting tool holder 16 shown in the form of a tool turret assembly 18 carried on X and Y axis slide assemblies 20 and 22. The operating components 12 are mounted on and supported by a structural frame 30 that includes a base 32 and a bed element 34. More specifically, the bed 34 is mounted on and supported by the base 32, and the operating components 12 are mounted on and supported by the bed element 34 as the operating components cooperate to machine a workpiece.

As best seen in FIG. 1, the bed element 34 has a pair of spaced end surfaces 36 and 38. The base 32 is formed by a pair of stanchions 40 and 42 located adjacent the end surfaces 36 and 38, respectively. Preferably, the bed 34 is an iron casting similar to the iron castings of conventional beds. The stanchion arms 40 and 42 are steel or other suitable cast metal.

As best seen in FIG. 2, a first fastener hole pattern 50 is formed in the stanchion 42 and a second fastener hole pattern 52 is formed in the end surface 36 to match the first fastener hole pattern. Preferably, an identical set of fastener hole patterns are provided on the stanchion 40 and the end surface 36. The patterns 50 and 52 are symmetrical about a horizontally extending central axis 54, and are alignable in a plurality of operative positions as they are rotated guidingly relative to each other about the axis 54.

Figure 3:
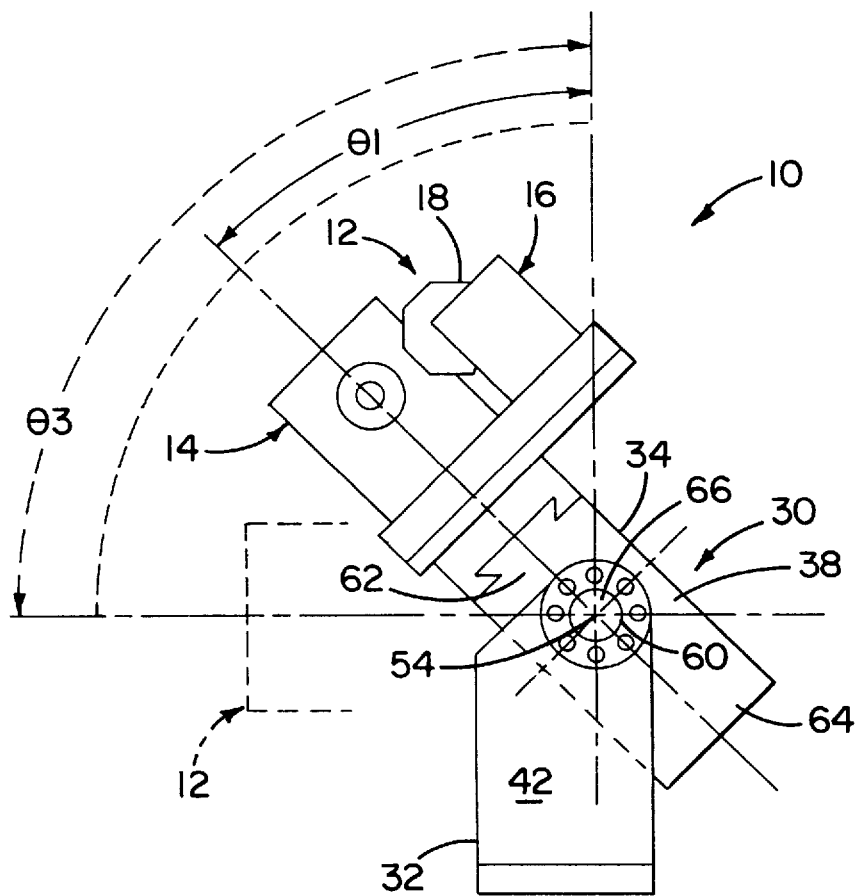
FIG. 3 is a right side elevation view of the machine tool shown in FIG. 1 showing the structural frame in a second orientation, with a portion of the frame broken away to reveal hidden elements.

Thus, as seen in FIG. 3, the bed 34 supports the operating components 12 in a first operative position at a first angle $\theta 1$ (approximately 45°) relative to the base 32 as the operating components cooperate to machine a workpiece. As seen in FIG. 2, the bed 34 supports the operating components 12 in a second operative position at a second angle $\theta 2$ (approximately 0°) relative to the base 32 as the operating components cooperate to machine a workpiece. As seen in FIG. 3, the structural frame 30 can provide a third operative position (shown hidden) wherein the bed 34 supports the operating components at a third angle $\theta 3$ (approximately to 90°) relative to the base 32 as the operating components cooperate to machine a workpiece. It should be understood from the foregoing that the number of operative positions provided by the structural frame 30 is dependent wholly upon the number and spacing of the holes in the hole patterns 50 and 52.

As seen in FIG. 1, the base 32 and the bed 34 are maintained relative to each other in any one of the operative positions by suitable fasteners 59 directed through the aligned hole patterns 50 and 52. In this regard, it should be understood that the hole patterns 50 and 52 could be defined by through holes that are suitable for receiving either a nut and bolt combination or a rivet. Alternatively, one of the hole patterns 50 and 52 could be defined by through holes and the other of the hole patterns could be defined by threaded holes suitable for receiving a threaded fastener, such as a shoulder bolt.

Preferably, the structural frame 30 further includes pivot mounts 60 for mounting the bed 34 to the stanchions 40 and 42 to allow pivoting movement between each of the operative positions. This simplifies the procedure required to modify the structural frame 30 from one operative position to another.

As best seen in FIGS. 2 and 3, the bed element 34 has an essentially rectangular cross-section that includes an upper structure 62 for mounting the operating components 12 and a lower structure 64 which provides a mass to counterbalance the mass of the operating components 12. More specifically, the fastener hole patterns 50 and 52 define a centroid 66 located at the axis 54. Preferably, the lower structure 64 is designed to have a sufficient mass to locate the center of gravity for the bed element 34 relative to the centroid 66 so that the combined center of gravity for the bed element 34 and the operating components 12 is approximately centered at the centroid 66 when the operating components 12 are mounted on the bed element 34. This serves to counterbalance the moment about the centroid 66 created by the operating components 12, thereby lowering stresses in the fastener 59 and the structure surrounding fastener hole patterns 50 and 52.

By providing a structural frame 30 capable of providing several different operative positions at several different angular orientations relative to the base 32, the structural frame 30 can be used to replace an entire product line of conventional slant bed machine tools. This eliminates the need for creating and maintaining the plurality of customized iron castings, with associated mold tooling, that must be provided for a product line of conventional slant bed machine tools. This also eliminates the need to produce and maintain a plurality of separate custom jigs that must be provided for a product line of conventional slant bed machine tools. Further, this eliminates the need for repetitive thermal and stress analyses that is required for a product line of conventional slant bed machine tools.

Further, assembly of the machine tool 10 is simplified in comparison to conventional slant bed machine tools because the operating components 12 can be assembled onto the bed 34 while the bed 34 is positioned with a slant angle θ equal to zero, as shown in FIG. 2. This eliminates the need for special assembly tools because the weight of the operating components 12 is supported on the bed 34. After the operating components 12 are assembled onto the bed 34, the bed may be reoriented to a different operating position having a different slant angle θ, as shown in FIG. 3.

It should also be appreciated that because the bed element 34 has an essentially rectangular cross-section, the bed element 34 may be machined without the use of a custom jig as is required for conventional slant bed machine tools. Further, because a jig is not required for the machining of the bed element 34, the milling machine used to mill the bed element may be smaller than the milling machine used to machine a bed element for a conventional slant bed machine tool. This permits increased accuracy and potential reduction in cost for the machining of the bed 34 because the smaller milling machine would typically be more accurate and less expensive than a larger milling machine.

I claim:

1. A structural frame for a machine tool, the machine tool including a tool holder and a workpiece holder for holding a workpiece as the workpiece is machined by a cutting tool held in the tool holder, said frame comprising:
    a base;
    a bed for supporting a tool holder and a workpiece holder as the tool holder and the workpiece holder cooperate to machine a workpiece; and
    means cooperating between the bed and the base for simultaneous movement of the bed, a tool holder supported by the bed and a workpiece holder supported by the bed relative to the base between
        a first operative position where the tool holder and the workpiece holder are supported by the bed at a first angular orientation relative to the base as the tool holder and workpiece holder cooperate to machine a workpiece, and
        a second operative position where the tool holder and the workpiece holder are supported by the bed at a second angular orientation relative to the base as the tool holder and the workpiece holder cooperate to machine a workpiece.

2. The frame of claim 1 wherein said cooperating means comprises a first fastener hole pattern on the base and a second fastener hole pattern on the bed, the first and second fastener hole patterns being aligned in both the first position and the second position.

3. The frame of claim 1 wherein said cooperating means comprises means for mounting the bed on the base for pivotable movement between the first and second positions.

4. The frame of claim 1 in combination with a workpiece holder and a tool holder of a machine tool.

5. A structural frame for a machine tool, the machine tool including a tool holder and a workpiece holder for holding a workpiece as the workpiece is machined by a cutting tool held in the tool holder, said frame comprising:
    a base including a first fastener hole pattern; and
    a bed for supporting a tool holder and a workpiece holder as the tool holder and the workpiece holder cooperate to machine a workpiece, the bed including a second fastener hole pattern that is alignable with the first fastener hole pattern to mount the bed on the base selectively in each of
        a first operative position where a tool holder and a workpiece holder are supported by the bed at a first angular orientation relative to the base as the tool holder and workpiece holder cooperate to machine a workpiece, and
        a second operative position where a tool holder and a workpiece holder are supported by the bed at a second angular orientation relative to the base as the tool holder and the workpiece holder cooperate to machine a workpiece.

6. The frame of claim 5 wherein the base further comprises a first stanchion spaced from a second stanchion, and wherein the first fastener hole pattern is on the first stanchion.

7. The structural frame of claim 6 further comprising means cooperating between the bed and the stanchions for simultaneous movement of the bed, a tool holder supported by the bed, and a workpiece holder supported by the bed between the first and second positions.

8. A structural frame for a machine tool, the machine tool including a tool holder and a workpiece holder for holding the workpiece as the workpiece is machined by a cutting tool held in the tool holder, said frame comprising:
    a base; and
    a bed for supporting a tool holder and a workpiece holder, the bed pivotable guidingly relative to the base about a predetermined axis, the bed having a center of gravity located relative to said axis to counterbalance a moment about said axis created by a tool holder and a workpiece holder supported on the bed.

9. A process for manufacturing a structural frame for a machine tool, the machine tool including a tool holder and a workpiece holder for holding a workpiece as the workpiece is machined by a cutting tool held in the tool holder, said process comprising the steps of:

forming a base having a first fastener hole pattern;

forming a bed having structure for supporting a tool holder and a workpiece holder as the tool holder and the workpiece holder cooperate to machine a workpiece;

forming a second fastener hole pattern on the bed that is alignable with the first fastener hole pattern selectively in each of a first operative position where a tool holder and a workpiece holder are supported by the bed at a first angular orientation relative to the base as the tool holder and workpiece holder cooperate to machine a workpiece, and a second operative position where a tool holder and a workpiece holder are supported by the bed at a second angular orientation relative to the base as the tool holder and the workpiece holder cooperate to machine a workpiece;

aligning the first and second fastener hole patterns in one of the first and second positions; and fastening the bed to the base in the one of the first and second positions using the fastener hole patterns.

* * * * *